(12) United States Patent
Park

(10) Patent No.: US 10,707,925 B2
(45) Date of Patent: Jul. 7, 2020

(54) ELECTRONIC DEVICE AND METHOD OF PERFORMING COMMUNICATION BY CONTROLLING MULTIPLE ANTENNAS IN DESIGNATED FREQUENCY BANDS

(71) Applicant: Samsung Electronics Co., Ltd., Gyeonggi-do (KR)

(72) Inventor: Jaewoon Park, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 16/275,471

(22) Filed: Feb. 14, 2019

(65) Prior Publication Data

US 2019/0319679 A1    Oct. 17, 2019

(30) Foreign Application Priority Data

Apr. 16, 2018  (KR) .................. 10-2018-0043782

(51) Int. Cl.
*H04B 7/0404* (2017.01)
*H04B 1/44* (2006.01)
*H04W 88/06* (2009.01)

(52) U.S. Cl.
CPC ............. *H04B 7/0404* (2013.01); *H04B 1/44* (2013.01); *H04W 88/06* (2013.01)

(58) Field of Classification Search
CPC ..... H04W 88/06; H04W 84/12; H04W 76/14; H04B 1/44; H04B 1/40; H04B 1/1027;

(Continued)

(56) References Cited

U.S. PATENT DOCUMENTS

2005/0277387 A1   12/2005  Kojima et al.
2007/0273606 A1   11/2007  Mak et al.
(Continued)

FOREIGN PATENT DOCUMENTS

KR  10-2005-0108287 A  11/2005
KR  10-2014-0031027 A   3/2014
WO     2017/171407 A1  10/2017

OTHER PUBLICATIONS

International Search Report dated May 22, 2019.

*Primary Examiner* — Diane D Mizrahi
(74) *Attorney, Agent, or Firm* — Cha & Reiter, LLC.

(57) ABSTRACT

According to an embodiment, an electronic device includes a first antenna configured to perform first communication using a first frequency band and second communication using a second frequency band in a first mode and a second mode, a second antenna configured to perform the first communication and the second communication in the second mode, a communication module configured to perform communication using the first antenna in the first mode and using the first antenna and the second antenna in the second mode, a first switch module, and at least one processor configured to, where the first communication is performed in the first mode, connect the second antenna with the communication module using the first switch module, and where the second communication is performed in the first mode, disconnect the second antenna from the communication module using the first switch module. Other embodiments are also disclosed.

8 Claims, 7 Drawing Sheets

(58) Field of Classification Search
CPC ...... H04B 1/3805; H04B 1/401; H04B 1/406; H01Q 21/00
See application file for complete search history.

(56) References Cited

U.S. PATENT DOCUMENTS

| | | |
|---|---|---|
| 2014/0105204 A1* | 4/2014 | Bengtsson ........... H04B 7/0608 370/345 |
| 2014/0192845 A1* | 7/2014 | Szini .................... H04B 7/0413 375/219 |
| 2016/0036512 A1* | 2/2016 | Rick ...................... H04B 1/006 375/267 |
| 2017/0048859 A1* | 2/2017 | Hayakawa ............... H01Q 1/48 |
| 2017/0201013 A1 | 7/2017 | Choi et al. |
| 2019/0036212 A1 | 1/2019 | Lee et al. |

* cited by examiner

ELECTRONIC DEVICE AND METHOD OF PERFORMING COMMUNICATION BY CONTROLLING MULTIPLE ANTENNAS IN DESIGNATED FREQUENCY BANDS

CROSS-REFERENCE TO RELATED APPLICATION(S)

This application is based on and claims priority under 35 U.S.C. 119 to Korean Patent Application No. 10-2018-0043782, filed on Apr. 16, 2018, in the Korean Intellectual Property Office, the disclosure of which is herein incorporated by reference in its entirety.

BACKGROUND

Field

Certain embodiments of the disclosure generally relate to electronic devices, and more particularly to electronic devices and methods of performing communication by controlling a plurality of antennas in designated frequency bands.

Description of Related Art

It has become increasingly common for various electronic information communication technologies performing various functionalities to be integrated into a single electronic device. For example, a smartphone may include diverse functionalities such as that of a sound player, imaging device, and scheduler. Other functionalities may be further implemented in the smartphone via different applications that are installed thereon.

The user of the electronic device may access a network, for example a communication network, to obtain information from other external electronic device such as servers. Direct access to the network (e.g., wired communication) may enable quick and stable communication but its usability may be limited because the electronic device has to be physically tethered. Wireless network access allows for more movement, and is being developed so that its communication stability and speed approach those of direct network access.

By including a communication module or antenna capable of using a plurality of communication frequency bands or a plurality of communication standards, the electronic device may be able to perform faster and more stable wireless communication. However, it may be difficult to install multiband-capable antennas in compact electronic devices such as mobile communication terminals. For example, a plurality of antennas transmitting and receiving in different frequency bands may need to be arranged apart from each other at a sufficient distance to avoid electromagnetic interference. However, for compact electronic devices, it may be difficult to provide these distances between the plurality of antennas, and electromagnetic interface may deteriorate the performance of each antenna.

The above information is presented as background information only to assist with an understanding of the disclosure. No determination has been made, and no assertion is made, as to whether any of the above might be applicable as prior art with regard to the disclosure.

SUMMARY

According to an embodiment, there may be provided a structure for shielding off electromagnetic interface between two antennas, thereby providing the antennas with an environment in which the antennas can stably work. However, for compact electronic devices, finding the room for such a structure within the electronic device may be difficult.

According to an embodiment, there may be provided an electronic device and method capable of performing communication by controlling a plurality of antennas in designated frequency bands and suppressing or mitigating electromagnetic interference between the two adjacent antennas.

According to an embodiment, there may be provided an electronic device and method capable of faster and more stable communication (e.g., wireless communication) by suppressing electromagnetic interference between a plurality of antennas despite the antennas being close to each other.

According to an embodiment, an electronic device comprises a first antenna configured to perform first communication using a first signal of a first frequency band and second communication using a second signal of a second frequency band in a first mode and a second mode, a second antenna configured to perform the first communication and the second communication in the second mode, a communication module configured to perform the first communication and the second communication using the first antenna in the first mode and perform the first communication and the second communication using the first antenna and the second antenna in the second mode, a first switch module disposed between the second antenna and the communication module, and at least one processor configured to, where the first communication is performed in the first mode, connect the second antenna with the communication module using the first switch module, and where the second communication is performed in the first mode, disconnect the second antenna from the communication module using the first switch module.

According to an embodiment, an electronic device comprises a first antenna configured to perform communication in a plurality of different frequency bands, a second antenna configured to selectively perform communication in a frequency band in which the first antenna performs communication, a communication module configured to perform communication using the first antenna in a single mode and perform communication using the first antenna and the second antenna in a multi-mode, a first switch module disposed between the second antenna and the communication module, a processor electrically connected with the first switch module, and a memory electrically connected with the processor, wherein the memory is configured to store instructions which, when executed, enable the processor to, where the communication is performed in first frequency bands of the plurality of different frequency bands in the single mode, connect the second antenna with the communication module using the first switch module and, where the communication is performed in second frequency bands of the plurality of different frequency bands different from the first frequency bands in the single mode, disconnect the second antenna from the communication module using the first switch module.

According to an embodiment, a method of operating an electronic device comprises selecting one of a first mode or a second mode as an operation mode of the electronic device, where the first mode is selected, selecting at least one of a plurality of different frequency bands and performing communication through a first antenna, where the selected at least one of a plurality of different frequency bands is a first frequency band, connecting a second antenna with a communication module, and where the selected at least one of a plurality of different frequency bands is a second frequency band different from the first frequency band, disconnect the second antenna from the communication module.

According to an embodiment, a storage medium of an electronic device stores instructions configured to enable a processor or a communication module of the electronic device to perform the operation method above.

Other aspects, advantages, and salient features of the disclosure will become apparent to those skilled in the art from the following detailed description, which, taken in conjunction with the annexed drawings, discloses example embodiments of the disclosure.

BRIEF DESCRIPTION OF THE DRAWINGS

A more complete appreciation of the disclosure and many of the attendant aspects thereof will be readily obtained as the same becomes better understood by reference to the following detailed description when considered in connection with the accompanying drawings, wherein:

FIG. 4 is an exploded perspective view illustrating an electronic device as illustrated in

FIG. 2;

Throughout the drawings, like reference numerals will be understood to refer to like parts, components, and structures.

DETAILED DESCRIPTION

Figure 1:
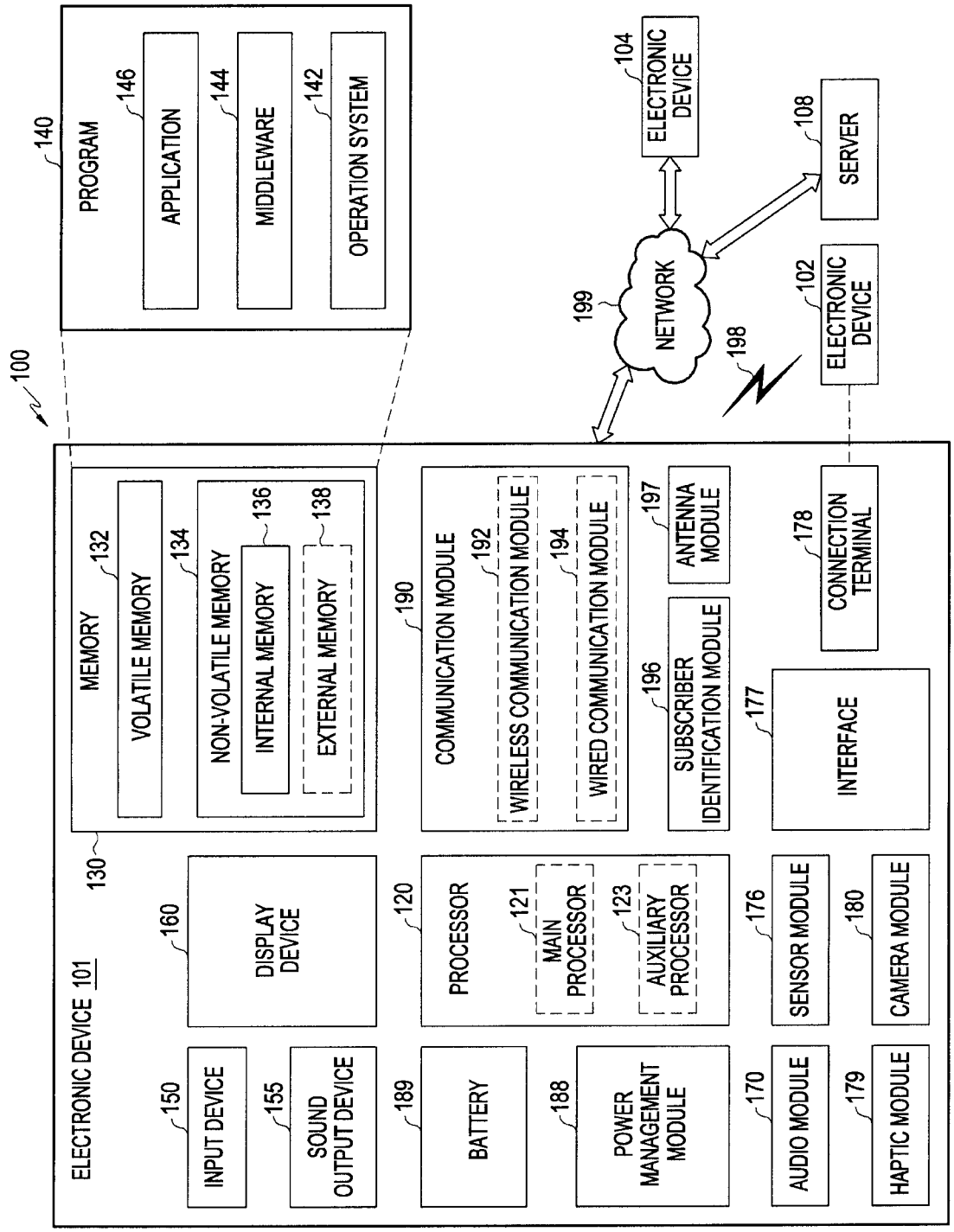
FIG. 1 is a block diagram illustrating an electronic device in a network environment according to an embodiment.

Various changes may be made to the disclosure, and the disclosure may come with a diversity of embodiments. Some embodiments of the disclosure are shown and described in connection with the drawings. However, it should be appreciated that the disclosure is not limited to the embodiments, and all changes and/or equivalents or replacements thereto also belong to the disclosure.

With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. The terms coming with ordinal numbers such as 'first' and 'second' may be used to denote various components, but the components are not limited by the terms. The terms are used only to distinguish one component from another. For example, a first component may be denoted a second component, and vice versa without departing from the disclosure. The term "and/or" may denote a combination(s) of a plurality of related items as listed or any of the items. It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

The terms "front," "rear surface," "upper surface," and "lower surface" are relative ones that may be varied depending on directions in which the figures are viewed, and may be replaced with ordinal numbers such as "first" and "second." The order denoted by the ordinal numbers, first and second, may be varied as desired.

The terms as used herein are provided merely to describe some embodiments thereof, but not to limit the disclosure. It is to be understood that the singular forms "a," "an," and "the" include plural references unless the context clearly dictates otherwise. It will be further understood that the terms "comprise" and/or "have," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which the embodiments of the disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "electronic device" may be any device with a touch panel, and the electronic device may also be referred to as a terminal, a portable terminal, a mobile terminal, a communication terminal, a portable communication terminal, a portable mobile terminal, or a display apparatus.

For example, the electronic device may be a smartphone, a mobile phone, a navigation device, a game device, a TV, a head unit for vehicles, a laptop computer, a tablet computer, a personal media player (PMP), or a personal digital assistant (PDA). The electronic device may be implemented as a pocket-sized portable communication terminal with a radio communication function. According to an embodiment of the disclosure, the electronic device may be a flexible device or a flexible display.

The electronic device may communicate with an external electronic device, e.g., a server, or may perform tasks by interworking with such an external electronic device. For example, the electronic device may transmit an image captured by a camera and/or location information detected by a sensor to a server through a network. The network may include, but is not limited to, a mobile or cellular communication network, a local area network (LAN), a wireless local area network (WLAN), a wide area network (WAN), the Internet, or a small area network (SAN).

FIG. 1 is a block diagram illustrating an electronic device 101 in a network environment 100 according to an embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, e.g., software (e.g., a program 140) to control at least one other component (e.g., a hardware or software component) of the electronic device 101 connected with the processor 120 and may process or compute various data. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record or as a dedicated speaker for call receiving, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain a sound through the input device 150 or output a sound through the sound output device 155 or an external electronic device (e.g., an electronic device 102 (e.g., a speaker or a headphone) directly or wirelessly connected with the electronic device 101.

The sensor module 176 may detect an internal operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocol(s) to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or wireless communication channel between the electronic device 101 and an external electronic device (e.g., the electronic device 102, the electronic device 104, or the server 108) and performing communication through the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other.

The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The first and second external electronic devices 102 and 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

As used herein, the term "module" includes a unit configured in hardware, software, or firmware and may interchangeably be used with other terms, e.g., "logic," "logic block," "part," or "circuit." A module may be a single integral part or a minimum unit or part for performing one or more functions. For example, the module may be configured in an application-specific integrated circuit (ASIC).

Certain embodiments as set forth herein may be implemented as software (e.g., the program 140) containing commands that are stored in a machine (e.g., computer)-readable storage medium (e.g., an internal memory 136) or an external memory 138. The machine may be a device that may invoke a command stored in the storage medium and may be operated as per the invoked command. The machine may include an electronic device (e.g., the electronic device 101) according to embodiments disclosed herein. When the command is executed by a processor (e.g., the processor 120), the processor may perform a function corresponding to the command on its own or using other components under the control of the processor. The command may contain a code that is generated or executed by a compiler or an interpreter. The machine-readable storage medium may be provided in the form of a non-transitory storage medium. Here, the term "non-transitory" simply means that the storage medium does not include a signal and is tangible, but this term does not differentiate between where data is semi-permanently stored in the storage medium and where data is temporarily stored in the storage medium.

According to an embodiment, a method according to certain embodiments of the disclosure may be included and provided in a computer program product. The computer program products may be traded as commodities between sellers and buyers. The computer program product may be distributed in the form of a machine-readable storage medium (e.g., a compact disc read only memory (CD-ROM)) or online through an application store (e.g., Playstore™). When distributed online, at least part of the computer program product may be temporarily generated or at least temporarily stored in a storage medium, such as the manufacturer's server, a server of the application store, or a relay server.

According to certain embodiments, each component (e.g., a module or program) may be configured of a single or multiple entities, and the certain embodiments may exclude some of the above-described sub components or add other sub components. Alternatively or additionally, some components (e.g., modules or programs) may be integrated into a single entity that may then perform the respective (pre-integration) functions of the components in the same or similar manner. According to certain embodiments, operations performed by modules, programs, or other components may be carried out sequentially, in parallel, repeatedly, or heuristically, or at least some operations may be executed in a different order or omitted, or other operations may be added.

Figure 2:
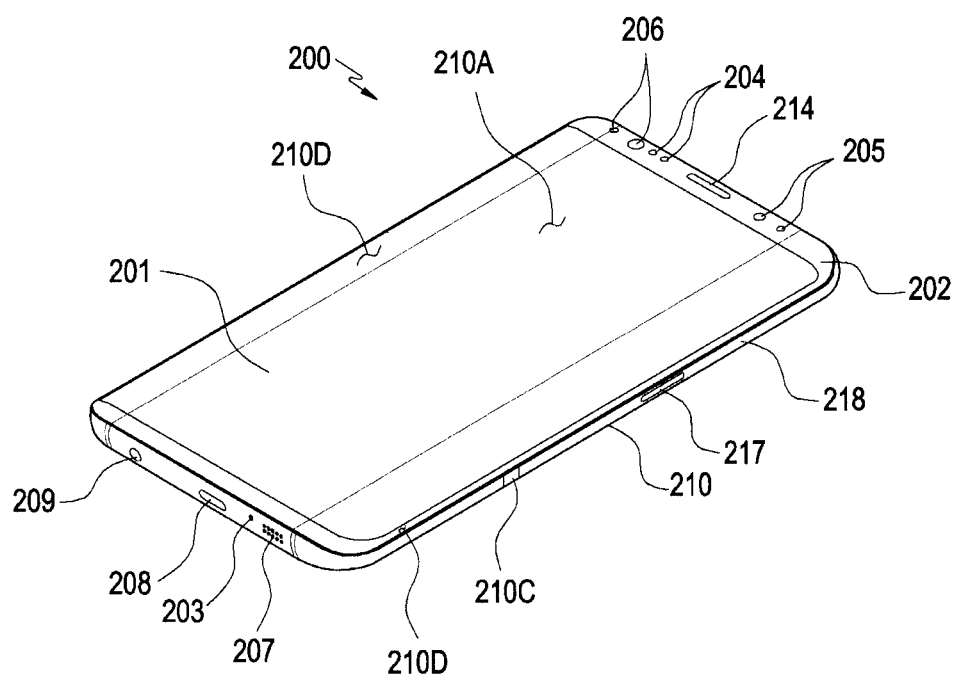
FIG. 2 is a front, perspective view illustrating an electronic device according to an embodiment.
Figure 3:
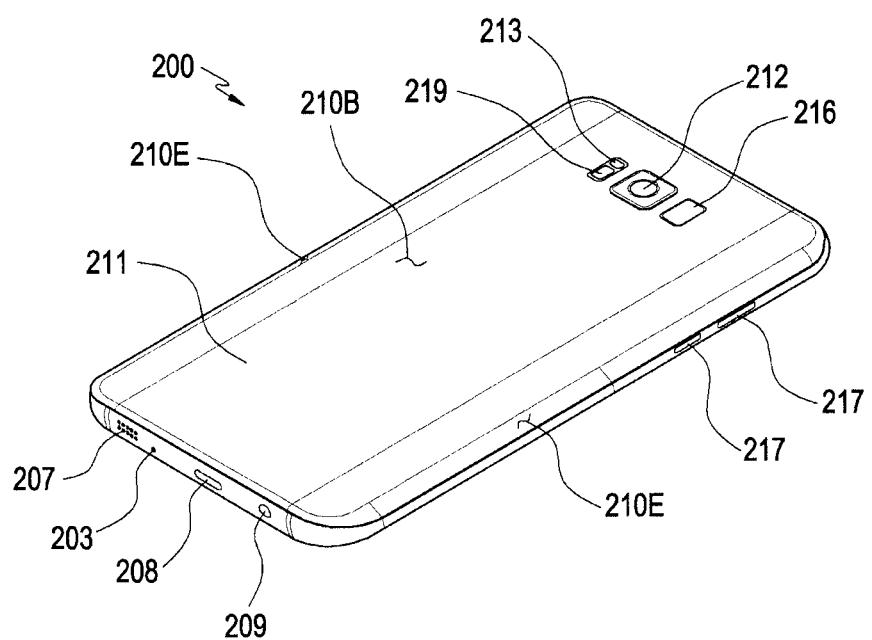
FIG. 3 is a rear, perspective view illustrating an electronic device as illustrated in FIG. 2.

FIG. 2 is a front perspective view illustrating an electronic device 200 according to an embodiment. FIG. 3 is a rear, perspective view illustrating an electronic device 200 as illustrated in FIG. 2.

Referring to FIGS. 2 and 3, according to an embodiment, an electronic device 200 may include a housing 210 with a first (or front) surface 210A, a second (or rear) surface 210B, and a side surface 210C surrounding a space between the first surface 210A and the second surface 210B. According to another embodiment (not shown), the housing may denote a structure forming part of the first surface 210A, the second surface 210B, and the side surface 210C of FIG. 2. According to an embodiment, at least part of the first surface 210A may have a substantially transparent front plate 202 (e.g., a glass plate or polymer plate including various coat layers). According to an embodiment, the front plate 202 may be coupled with the housing 210 and, along with the housing 210, may form an internal space. Here, the 'internal space' may mean a space between the front plate 202 and a first supporting member (e.g., the first supporting member 411 of FIG. 4) described below. According to an embodiment, the 'internal space' may mean a space, as an internal space, for receiving at least part of the display 430 of FIG. 4 or the display 201 described below.

According to an embodiment, the second surface 210B may be formed of a substantially opaque rear plate 211. The rear plate 211 may be formed of, e.g., laminated or colored glass, ceramic, polymer, metal (e.g., aluminum, stainless steel (STS), or magnesium), or a combination of at least two thereof. The side surface 210C may be formed by a side bezel structure (or a "side member") 218 that couples to the front plate 202 and the rear plate 211 and includes a metal and/or polymer. According to an embodiment, the rear plate 211 and the side bezel plate 218 may be integrally formed together and include the same material (e.g., a metal, such as aluminum).

In the embodiment illustrated, the front plate 202 may include two first regions 210D (e.g., the curved portions R of FIG. 4), which seamlessly and bendingly extend from the first surface 210A to the rear plate 211, on both the long edges of the front plate 202. In the embodiment (refer to FIG. 3) illustrated, the rear plate 211 may include second regions 210E, which seamlessly and bendingly extend from the second surface 210B to the front plate 202, on both the long edges. According to an embodiment, the front plate 202 (or the rear plate 211) may include one of the first regions 210D (or the second regions 210E). Alternatively, the first regions 210D or the second regions 210E may partially be excluded. According to an embodiment, at side view of the electronic device 200, the side bezel structure 218 may have a first thickness (or width) for sides (e.g., the side where the connector hole 208 is formed) that do not have the first regions 210D or the second regions 210E and a second thickness, which is smaller than the first thickness, for sides (e.g., the side where the key input device 217 is disposed) that have the first regions 210D or the second regions 210E.

According to an embodiment, the electronic device 200 may include at least one or more of a display 201, audio modules 203, 207, and 214, sensor modules 204, 216, and 219, camera modules 205, 212, and 213, key input devices 217, a light emitting device 206, and connector holes 208 and 209. According to an embodiment, the electronic device 200 may exclude at least one (e.g., the key input device 217 or the light emitting device 206) of the components or may add other components.

The display 201 may be exposed through the top of, e.g., the front plate 202. According to an embodiment, at least a portion of the display 201 may be exposed through the front plate 202 forming the first surface 210A and the first regions 210D of the side surface 210C. According to an embodiment, the edge of the display 201 may be formed to be substantially the same in shape as an adjacent outer edge of the front plate 202. According to an embodiment, the interval between the outer edge of the display 201 and the outer edge of the front plate 202 may remain substantially even to give a larger area of exposure the display 201.

According to an embodiment, the screen display region (e.g., the active region), or a region (e.g., the inactive region) off the screen display region, of the display 201 may have a recess or opening in a portion thereof, and at least one or more of the audio module 214, sensor module 204, camera module 205, and light emitting device 206 may be aligned with the recess or opening. According to an embodiment, at least one or more of the audio module 214, sensor module 204, camera module 205, fingerprint sensor 216, and light emitting device 206 may be included on the rear surface of the screen display region of the display 201. According to an embodiment, the display 201 may be disposed to be coupled with, or adjacent, a touch detecting circuit, a pressure sensor capable of measuring the strength (pressure) of touches, and/or a digitizer for detecting a magnetic field-type stylus pen. According to an embodiment, at least part of the sensor modules 204 and 219 and/or at least part of the key input devices 217 may be disposed in the first regions 210D and/or the second regions 210E.

The audio modules 203, 207, and 214 may include a microphone hole 203 and speaker holes 207 and 214. The microphone hole 203 may have a microphone inside to obtain external sounds. According to an embodiment, there may be a plurality of microphones to be able to detect the direction of a sound. The speaker holes 207 and 214 may include an external speaker hole 207 and a phone receiver hole 214. According to an embodiment, the speaker holes 207 and 214 and the microphone hole 203 may be implemented as a single hole, or speakers may be rested without the speaker holes 207 and 214 (e.g., piezo speakers).

The sensor modules 204, 216, and 219 may generate an electrical signal or data value corresponding to an internal operating state or external environmental state of the electronic device 200. The sensor modules 204, 216, and 219 may include a first sensor module 204 (e.g., a proximity sensor) and/or a second sensor module (not shown) (e.g., a fingerprint sensor) disposed on the first surface 210A of the housing 210 and/or a third sensor module 216 (e.g., a heart-rate monitor (HRM) sensor) and/or a fourth sensor module 216 (e.g., a fingerprint sensor) disposed on the second surface 210B of the housing 210. The fingerprint sensor may be disposed on the second surface 210A as well as on the first surface 210B (e.g., the display 201) of the housing 210. The electronic device 200 may further include sensor modules not shown, e.g., at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor 204.

The camera modules 205, 212, and 213 may include a first camera device 205 disposed on the first surface 210A of the electronic device 200, and a second camera device 212 and/or a flash 213 disposed on the second surface 210B. The camera modules 205 and 212 may include one or more lenses, an image sensor, and/or an image signal processor. The flash 213 may include, e.g., a light emitting diode (LED) or a xenon lamp. According to an embodiment, two or more lenses (an infrared (IR) camera, a wide-angle lens, and a telescopic lens) and image sensors may be disposed on one surface of the electronic device 200.

The key input device 217 may be disposed on the side surface 210C of the housing 210. According to an embodiment, the electronic device 200 may exclude all or some of the above-mentioned key input devices 217 and the excluded key input devices 217 may be implemented in other forms, e.g., as soft keys, on the display 201. According to an embodiment, the key input device may include the sensor module 216 disposed on the second surface 210B of the housing 210.

The light emitting device 206 may be disposed on, e.g., the first surface 210A of the housing 210. The light emitting device 206 may provide, e.g., information about the state of the electronic device 200 in the form of light. According to an embodiment, the light emitting device 206 may provide a light source that interacts with, e.g., the camera module 205. The light emitting device 206 may include, e.g., a light emitting device (LED), an infrared (IR) LED, or a xenon lamp.

The connector holes 208 and 209 may include a first connector hole 208 for receiving a connector (e.g., a universal serial bus (USB) connector) for transmitting or receiving power and/or data to/from an external electronic device and/or a second connector hole 209 (e.g., an earphone jack) for receiving a connector for transmitting or receiving audio signals to/from the external electronic device.

Figure 4:
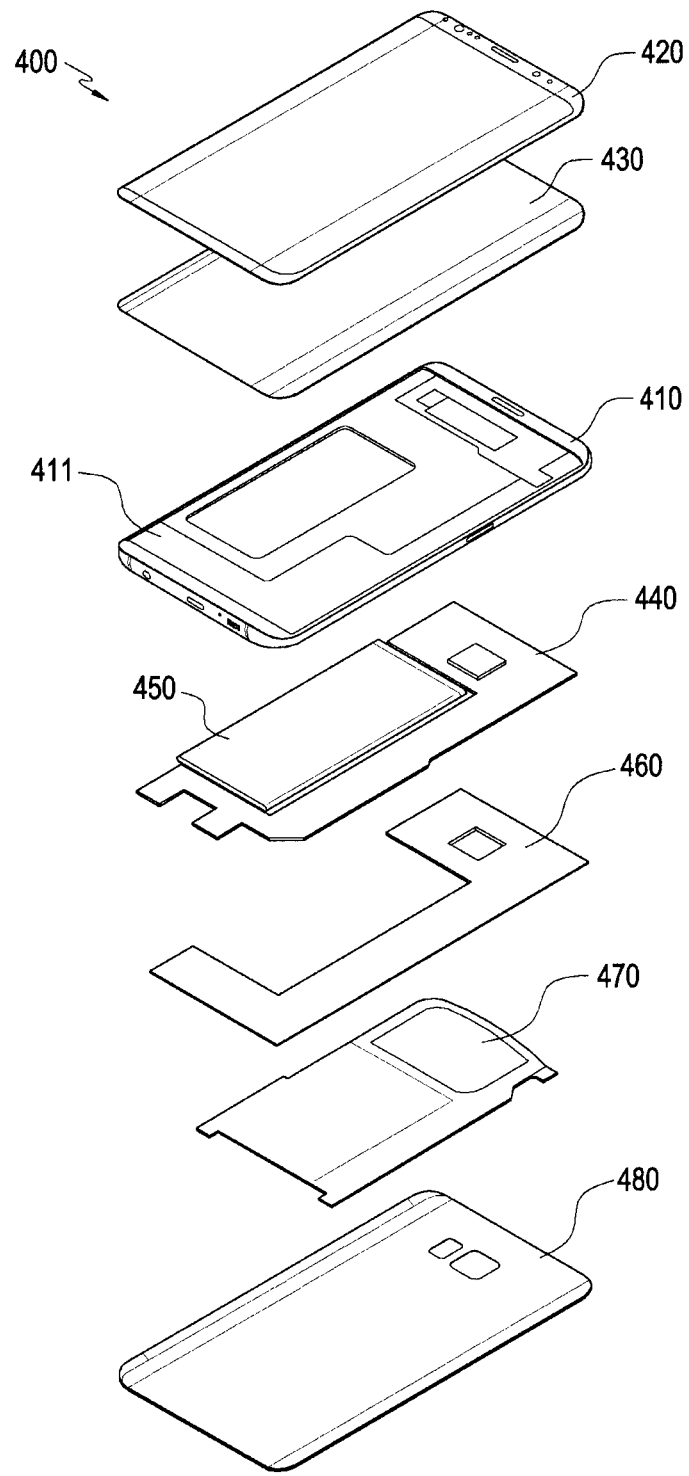

FIG. 4 is an exploded perspective view illustrating an electronic device as illustrated in FIG. 2.

Referring to FIG. 4, an electronic device 400 may include a side bezel structure 410, a first supporting member 411 (e.g., a bracket), a front plate 420, a display 430, a printed circuit board 440, a battery 450, a second supporting member 460 (e.g., a rear case), an antenna 470, and a rear plate 480. According to an embodiment, the electronic device 400 may exclude at least one (e.g., the first supporting member 411 or the second supporting member 460) of the components or may add other components. At least one of the components of the electronic device 400 may be the same or similar to at least one of the components of the electronic device 200 of FIG. 2 or 3 and no duplicate description is made below.

The first supporting member 411 may be disposed inside the electronic device 400 to be connected with the side bezel structure 410 or integrated with the side bezel structure 410. The first supporting member 411 may be formed of, e.g., a metal and/or non-metallic material (e.g., polymer). The display 430 may be joined onto one surface of the first supporting member 411, and the printed circuit board 440 may be joined onto the opposite surface of the first supporting member 411. A processor, memory, and/or interface may be mounted on the printed circuit board 440. The processor may include one or more of, e.g., a central processing unit, an application processor, a graphic processing device, an image signal processing, a sensor hub processor, or a communication processor.

Substantially the entire region of the display 430 may be attached on an inner surface of the front plate 420, and an opaque layer may be formed around or along the periphery of the region where the display 430 is attached on the inner surface of the front plate 420. In the region of the front plate 420 where the display 430 is not disposed, the opaque layer may prevent part of the internal structure (e.g., the first supporting member 411) of the electronic device 400 from being exposed to the outside.

The memory may include, e.g., a volatile or non-volatile memory.

The interface may include, e.g., a high definition multimedia interface (HDMI), a universal serial bus (USB) interface, a secure digital (SD) card interface, and/or an audio interface. The interface may electrically or physically connect, e.g., the electronic device 400 with an external electronic device and may include a USB connector, an SD card/multimedia card (MMC) connector, or an audio connector.

The battery 450 may be a device for supplying power to at least one component of the electronic device 400. The battery 189 may include, e.g., a primary cell which is not rechargeable, a secondary cell which is rechargeable, or a fuel cell. At least a portion of the battery 450 may be disposed on substantially the same plane as the printed circuit board 440. The battery 450 may be integrated or detachably disposed inside the electronic device 400.

The antenna 470 may be disposed between the rear plate 480 and the battery 450. The antenna 470 may include, e.g., a near-field communication (NFC) antenna, a wireless charging antenna, and/or a magnetic secure transmission (MST) antenna. The antenna 470 may perform short-range communication with, e.g., an external device or may wirelessly transmit or receive power utilized for charging. According to an embodiment of the disclosure, an antenna structure may be formed by a portion or combination of the side bezel structure 410 and/or the first supporting member 411.

Figure 5:
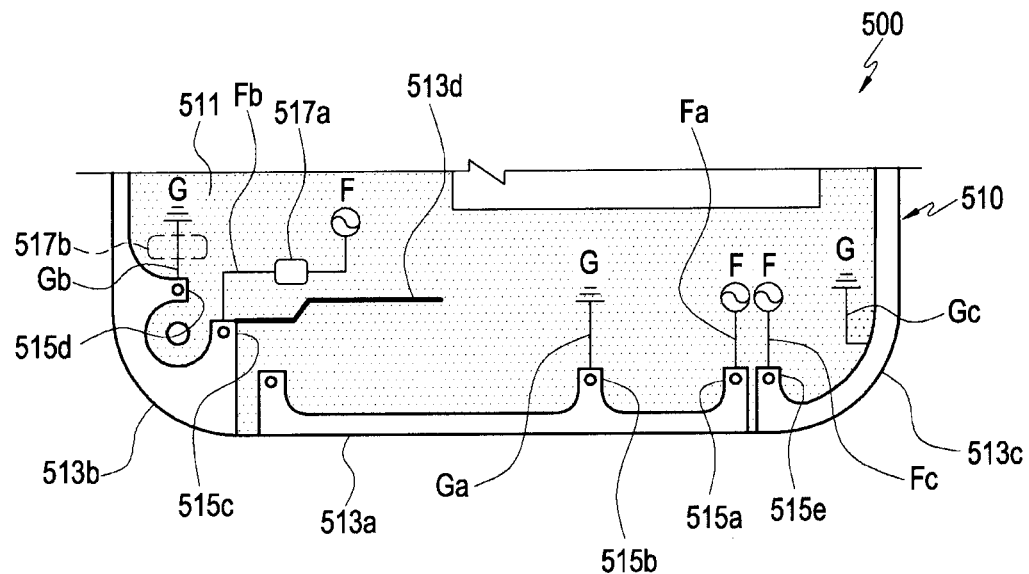
FIG. 5 is a view illustrating a configuration of an antenna device in an electronic device according to an embodiment.

FIG. 5 is a view illustrating a configuration of an antenna device in an electronic device (e.g., the electronic device 101 or 400 of FIG. 1 or 4) according to an embodiment.

Referring to FIG. 5, a side member 510 (e.g., the side bezel structure 410 of FIG. 4) of an electronic device 500 (e.g., the electronic device 400 of FIG. 4) may include a plurality of electrically conductive portions, and some of antennas of the electronic device 500 may be implemented as the electrically conductive portion(s) of the side member 510. For example, a first antenna may be implemented as an electrically conductive portion denoted by reference number "513a." According to an embodiment, the electronic device 500 may include a second and/or third antenna implemented as electrically conductive portions denoted by reference numbers "513b" or "513c." In the following description, the first, second, and third antennas are denoted with reference numbers "513a," "513b," and "513c."

According to an embodiment, to perform wireless communication, at least some of the electrically conductive portions of the side member 510, e.g., the first, second, and/or third antennas 513a, 513b, and 513c, may be connected to a communication circuit (e.g., the processor 120 or the communication module 190 of FIG. 1) of the electronic device 500 and ground G. According to an embodiment, the first antenna 513a may form at least part of a straight section of the side member 510, which is disposed at the top or bottom of the electronic device 500. The second antenna 513b and/or the third antenna 513c, on the other hand, may be disposed adjacent the first antenna 513a and at corners of the electronic device 500.

According to an embodiment, the first antenna 513a, the second antenna 513b, and the third antenna 513c may include power feeding protrusions 515a, 515c, and 515e, respectively, and ground protrusions 515b and 515d. The power feeding protrusions 515a, 515c, and 515e and the ground protrusions 515b and 515d each may extend inward from the inner surface of the side member 510. According to an embodiment, an internal plate 511, e.g., the first supporting member 411 of FIG. 4, may be substantially integrally formed with the side member 510. For example, the internal plate 511 may be a resin and be formed in an uni-body manner with the side member 510 by insert-molding. According to an embodiment, the internal plate 511 may include a portion made of an electrically conductive material, e.g. metal. The electrically conductive portion of the internal plate 511 may be formed together with the side member 510 when the side member 510 is produced or processed. After insert-molding, the electrically conductive portion of the internal plate 511 may, along with the synthetic resin portion, form the internal plate 511.

According to an embodiment, the power feeding protrusions 515a, 515c, and 515e and/or the ground protrusions 515b and 515d may reinforce the coupling between the side member 510 and the internal plate 511. For example, the power feeding protrusions 515a, 515c, and 515e and/or the ground protrusions 515b and 515d may provide a larger overlapping area between the synthetic resin portion of the internal plate 511 and the electrically conductive portion of the side member 510 so that the two can be better coupled or joined together. According to an embodiment, a portion of the internal plate 511 may be interposed between the first antenna 513a and the second antenna 513b and/or between the first antenna 513a and the third antenna 513c. For example, the second antenna 513b and the third antenna 513c may be each disposed to be adjacent to an end of the first antenna 513a, and the internal plate 511 may form an electrically insulating structure between the first antenna 513a and the second antenna 513b, and between the first antenna 513a and the third antenna 513c.

According to an embodiment, a radiating conductor pattern 513d may be formed on the surface of the internal plate 511 or inside the internal plate 511. The radiating conductor pattern 513d may be formed by various methods, such as printing, depositing, coating, etc. According to an embodiment, the radiating conductor pattern 513d may be formed by laser-processing the surface of the synthetic resin portion of the internal plate 511 and then depositing metal onto the laser-processed area. According to an embodiment, the radiating conductor pattern 513d may be connected to the electrically conductive portion of the side member 510, so that it is at least part of the first antenna 513a, the second antenna 513b, or the third antenna 513c. The radiating conductor pattern 513d may be further connected to the communication module (e.g., the communication module 190 of FIG. 1). In the embodiment shown in FIG. 5, the radiating conductor pattern 513d is connected with the second antenna 513b. However, embodiments of the disclosure are not limited thereto. For example, the radiating conductor pattern 513d may be not connected with the first antenna 513a or the second antenna 513b but may rather be an independent, additional antenna.

According to an embodiment, the first antenna 513a, the second antenna 513b, and the third antenna 513c each may be electrically connected with the communication module (e.g., the wireless communication module 192 of FIG. 1) to perform wireless communication. For example, the first antenna 513a, the second antenna 513b, and the third antenna 513c each may receive power from the communication module to transmit wireless signals, or the communication module may receive wireless signals through the first antenna 513a, the second antenna 513b, and/or the third antenna 513c. According to an embodiment, the first antenna 513a, the second antenna 513b, and the third antenna 513c each may be connected to the ground G. The first antenna 513a, the second antenna 513b, or the third antenna 513c may be implemented as various types of antennas, such as monopole antennas, dipole antennas, loop antennas, or planar inverted-F antennas (PIFA), depending on whether it is connected with the ground G and the position or structure of the connection. The first antenna 513a, the second antenna 513b, or the third antenna 513c may be connected to a power feeder F (e.g., the communication module) through the power feeding protrusion 515a, 515c, or 515e and to the ground G through the ground protrusion 515b or 515d. To connect with the power feeder F or the ground G, the first antenna 513a, the second antenna 513b, and the third antenna 513c, respectively, may include power feeding lines Fa, Fb, and Fc and ground lines Ga, Gb, and Gc. The power feeding lines Fa, Fb, and Fc or the ground lines Ga, Gb, and Gc. These lines may be implemented as printed circuit patterns formed on a circuit board (e.g., the printed circuit board 340 of FIG. 4), various cables or flexible printed circuit boards, or C-clips.

According to an embodiment, the second antenna 513b may be connected with the power feeder F (e.g., the communication module) through the power feeding line Fb. The electronic device 500 may include a first switch module 517a disposed between the second antenna 513b and the power feeder F. For example, according to the operation of the first switch module 517a, the second antenna 513b may be connected to, or disconnected from, the communication module (e.g., the wireless communication module 192 of FIG. 1). According to an embodiment, the electronic device 500 may further include a second switch module 517b or a matching device (e.g., the matching device 717c of FIG. 7 described below) disposed between the ground G and the second antenna 513b. The second switch module 517b may select one among a plurality of paths and connect the second antenna 513b with the ground G. For example, the second switch module 517b may adjust the radiating capability (e.g., optimize the radiating characteristics) of the second antenna 513b according to, for example, the operation frequency band of the second antenna 513b. According to an embodiment, the second antenna 513b may independently perform wireless communication using the same frequency band as the first antenna 513a. In this example, in combination with the first antenna 513a, the second antenna 513b may implement a multi-mode operation, e.g., MIMO (multiple-input and multiple-output) operation.

Figure 6:
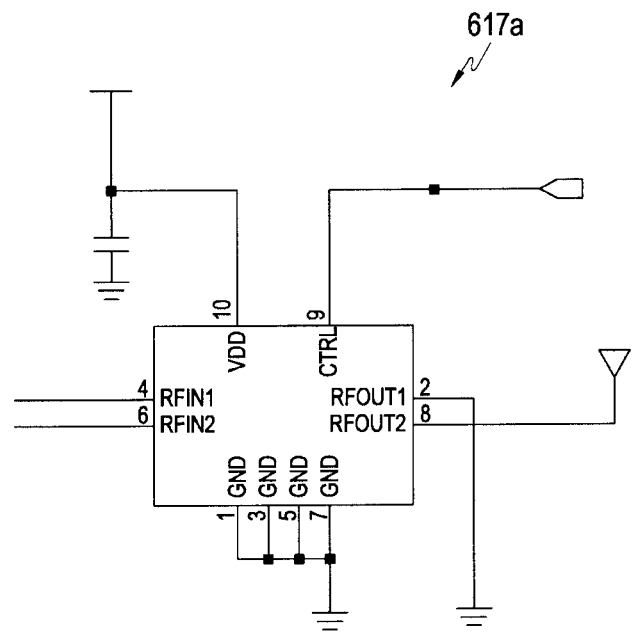
FIG. 6 is a block diagram illustrating a configuration of a first switch module of an antenna device in an electronic device according to an embodiment.

FIG. 6 is a block diagram illustrating a configuration of a first switch module 617a (e.g., the first switch module 517a of FIG. 5) of an antenna device in an electronic device according to an embodiment.

Referring to FIG. 6, the first switch module 617a may include at least one input port RFIN1 and RFIN2, at least one output port RFOUT1 and RFOUT2, a power port VDD, a control signal port CTRL, and ground port(s) GND. The first switch module 617a may establish or cut off electrical paths between the input port RFIN1 or RFIN2 and the output port RFOUT1 or RFOUT2, depending on the signals input through the control signal port CTRL. In other words, the first switch module 617a may establish, or refrain from establishing, electric paths between the input port RFIN1 or RFIN2 and the output port RFOUT1 or RFOUT2, respectively. According to an embodiment, in a first mode, e.g., a single or non-MIMO mode, the electric paths between the input port RFIN1 or RFIN2 and the output port RFOUT1 or RFOUT2 may be cut off, and the communication module (e.g., the wireless communication module 192 of FIG. 1) may perform wireless communication using the first antenna 513a. Alternatively, in the first mode, the electric paths between the input port RFIN1 or RFIN2 and the output port RFOUT1 or RFOUT2 may be established. For example, in the first mode, the first switch module 617a may connect the second antenna 513b with the communication module depending on the frequency band in which the first antenna 513a performs wireless communication, as described below in connection with Table 1. Where the operation mode of the electronic device 500 (e.g., the electronic device 101 of FIG. 1) is the first mode and the second antenna 513b is connected with the communication module, the communication module may transmit or receive wireless signals through the first antenna 513a and may refrain from processing signals transmitted or received through the second antenna 513b.

According to an embodiment, in a second mode, e.g., the above-described multi-mode or MIMO mode, electric paths between the input port RFIN1 or RFIN2 and the output port RFOUT1 or RFOUT2 may be established. For example, the second antenna 513b may be electrically connected with the communication module via the input port RFIN1 and the output port RFOUT1, which correspond to the frequency band of the first antenna 513a, and the second antenna 513b may perform communication using the same frequency band as the first antenna 513a. For example, in the multi-mode, the first antenna 513a and the second antenna 513b, in combination, may implement MIMO operation, and the communication module may process signals transmitted or received through each of the first antenna 513a and the second antenna 513b.

According to an embodiment, as set forth above, in the first mode, e.g., the above-described single mode, the first switch module 617a may electrically connect the second antenna 513b with the communication module or refrain connecting the second antenna 513b to the communication module. In the single mode in which communication is performed using the first antenna 513a alone, the radiating capability of the first antenna 513a may be varied depending on whether the second antenna 513b is electrically connected. For example, in the single mode, when the first antenna 513a performs communication using some frequency bands (hereinafter, "first frequency bands") of a plurality of frequency bands, the second antenna 513b may be connected with the communication module (e.g., the first switch module turns on), enhancing the radiating power or reception sensitivity of the first antenna 513a. Alternatively, in the single mode, when the first antenna 513a performs communication using other frequency bands (hereinafter, "second frequency bands") of the plurality of frequency bands, the connection between the second antenna 513b and the communication module may be cut off (e.g., the first switch module turns off), enhancing the radiating power or reception sensitivity of the first antenna 513a. Table 1 below shows the results of measurement of the radiating capability of the first antenna 513a depending on whether the second antenna 513b is electrically connected in the single mode.

TABLE 1

| | | Frequency band | | | | | | |
|---|---|---|---|---|---|---|---|---|
| | | LTE B71 | LTE B12 | LTE B13 | LTE B5 | LTE B2 | LTE B66 | LTE B30 |
| second antenna disconnection | radiating power | 17.55 | 18.34 | 18.60 | 18.22 | 18.12 | 19.45 | 18.17 |
| | reception sensitivity | −88.40 | −90.10 | −99.40 | −91.70 | −94.80 | −95.20 | −92.10 |
| second antenna connection | radiating power | 17.51 | 18.34 | 18.72 | 18.37 | 18.75 | 19.99 | 17.46 |
| | reception sensitivity | −88.10 | −89.90 | −90.60 | −92.10 | −94.90 | −95.40 | −91.90 |

Table 1 above shows the radiating power and reception sensitivity measured in dBm when the first antenna 513a performs wireless communication in the single mode in commercial wireless communication frequency bands, e.g. LTE bands. Referring to Table 1, the radiating power and the reception sensitivity are measured in two different cases—when the second antenna 513b is connected to the communication module and when it is disconnected to the communication module.

Although the electronic device (e.g., the electronic device 101 of FIG. 1) operates in the single mode, it can be shown that when the second antenna 513b is connected to the communication module (e.g., the wireless communication module 192 of FIG. 1), the radiating power or reception sensitivity of the first antenna 513a may be enhanced in the frequency bands (e.g., the first frequency bands) of LTE B13, LTE B5, and LTE B2. As such, when the first antenna 513a performs communication using these first frequency bands in the single mode, the electronic device or its processor (e.g., the electronic device 101 or the processor 120 of FIG. 1) may connect the second antenna 513b with the communication module using the first switch module 617a.

According to an embodiment, in the single mode, cutting off the electrical connection to the second antenna 513b may further enhance the radiating power of the first antenna 513a in the frequency band (e.g., one of the second frequency bands) of LTE B30. As such, when the first antenna 513a performs communication using the LTE B30 frequency band in the single mode, the electronic device or the processor may cut off the electrical connection between the second antenna 513*b* and the communication module using the first switch module 617*a*.

As shown in Table 1, compared to the variations in radiating capability in the LTE B13, LTE B5, and LTE B2 bands, variations in the radiating capability of the first antenna 513*a* when the first switch module 617*a* is turned on or off in the frequency bands of LTE B71, LTE B12, and LTE B13 may relatively be small. Power consumption may be taken into consideration when classifying the LTE B71, LTE B12, and LTE B13 bands as the first frequency bands or the second frequency bands. For example, when the first switch module 617*a* is in the on state (e.g., when the second antenna 513*b* is connected with the communication module), the power consumption of the electronic device may increase. Because turning on the first switch module 617*a* has little effect on bands LTE B71, LTE B12, and LTE B13, to conserve power, the frequency bands of LTE B71, LTE B12, and LTE B13 may be classified as the second frequency bands. Thus, frequency bands may be classified as a first frequency band or a second frequency band depending on the variations in the radiating capability (e.g., radiating power or reception sensitivity) of the first antenna 513*a* relative to the increased power consumption. For example, when the first antenna 513*a* is operating in a frequency band whose variation in radiating capability caused by connecting the second antenna 513*b* with the communication module is small or lowered, and the electronic device or the processor (e.g., the processor 120 of FIG. 1) may cut off the connection between the second antenna 513*b* and the communication module.

Although in the above description made in connection with Table 1, some of the operation frequency bands of the first antenna 513*a* (e.g., LTE B13, LTE B5, and LTE B2) are classified as the first frequency bands, and the rest are classified as the second frequency bands, embodiments of the disclosure are not limited thereto. For example, as set forth above, the classification as first frequency band or second frequency band may depend on various factors such as the variations in the radiating capability of the first antenna relative to the increased power consumption. According to an embodiment, as described above, the electronic device may include more antennas (e.g., the third antenna 513*c*), and the classification of bands into first frequency bands or second frequency bands may further depend on the radiating capability of other antenna(s) as well as the first antenna 513*a* or the second antenna 513*b*. The frequency bands classified as first frequency bands in the above embodiments may be classified as second frequency bands in other embodiments. For example, the first antenna 513*a* or the second antenna 513*b* may exhibit a different radiating capability than the results of measurement set forth in Table 1 above depending on the structure of the electronic device or the installation environment (e.g., the arrangement of peripheral electronic parts) of each antenna, so that the structure of the electronic device or the installation environment of each antenna may be considered in classifying the frequency bands.

Figure 7:
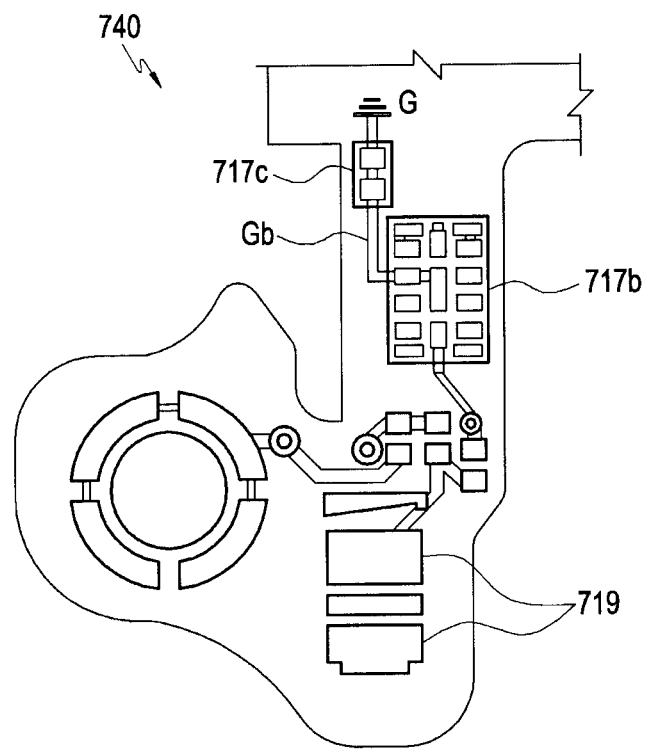
FIG. 7 is a plan view illustrating an example in which a second switch module is disposed, in enlarged view of a portion of a circuit board of an electronic device according to an embodiment.

FIG. 7 is a plan view illustrating an example in which a second switch module 717*b* is disposed, in enlarged view of a portion of a circuit board (e.g., the printed circuit board 440 of FIG. 4) of an electronic device according to an embodiment.

Referring to FIG. 7, the second switch module 717*b* (e.g., the second switch module 517*b* of FIG. 5) may be disposed on the circuit board 740, and may be configured to set a path to connect the second antenna (e.g., the second antenna 513*b* of FIG. 5) with the ground G. For example, the second switch module 717*b*, as a single-pole multi-through (SPMT) switch, may be disposed on the ground line Gb between the second antenna 513*b* (now shown in FIG. 7) and the ground G. One of a plurality of paths of the second switch module 717*b* may be selected to connect the second antenna 513*b* to the ground G. According to an embodiment, the electronic device may further include a matching device 717*c* disposed between the ground G and the second switch module 717*b* or between the second switch module 717*b* and the second antenna 513*b*. The matching device 717*c* may be disposed on at least one of the plurality of paths, optimizing the radiating characteristics of the second antenna 513*b*.

According to an embodiment, the circuit board 740 may include a connecting pad 719, and a connecting terminal, e.g., a C-clip, may be disposed on the connecting pad 719. When the circuit board 740 is disposed on a side member (e.g., the side member 510 of FIG. 5) or an internal plate (e.g., the internal plate 511 of FIG. 5) of the electronic device, the connecting terminal disposed on the connecting pad 719 may come in contact with a ground protrusion (e.g., the ground protrusion 515*d* of FIG. 5) of the second antenna 513*b*. Thus, the connecting pad 719 may form a portion of a ground line (e.g., the ground line Gb of FIG. 5). A certain embodiment, the second switch module 717*b* may be not disposed on the ground line but on a power feeding line. When the second switch module 717*b* is disposed on the power feeding line, the connecting terminal disposed on the connecting pad 719 may come in contact with a power feeding protrusion (e.g., the power feeding protrusion 515*c* of FIG. 5) of the second antenna 513*b*. Thus, the connecting pad 719 may form a portion of a power feeding line (e.g., the power feeding line Fb of FIG. 5).

Figure 8:
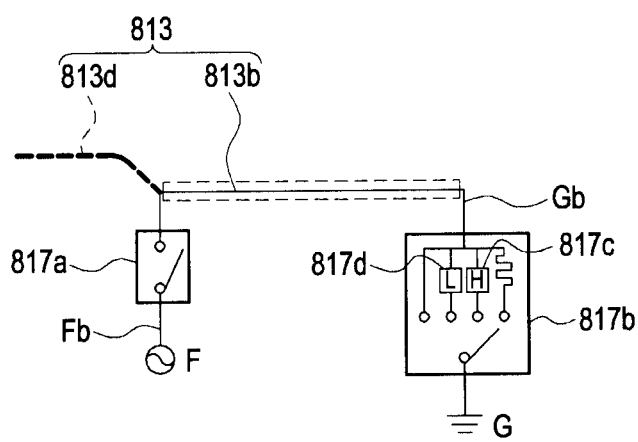
FIG. 8 is a view illustrating a configuration of a second antenna of an electronic device according to an embodiment.

FIG. 8 is a view illustrating a configuration of a second antenna 813 of an electronic device according to an embodiment.

Referring to FIG. 8, the second antenna 813 (e.g., the second antenna 513*b* of FIG. 5) may include a first radiating conductor 813*b* having an end connected with the power feeding line Fb and another end connected with the ground line Gb. For example, the first radiating conductor 813*b* may form a loop antenna structure. According to an embodiment, the first radiating conductor 813*b* may be part of the side member 510 of FIG. 5. According to an embodiment, the second antenna 813 may include a second radiating conductor 813*d* (e.g., the radiating conductor pattern 513*d* of FIG. 5) connected with the power feeding line Fb. For example, the second antenna 813 may be formed as a combination of the first radiating conductor 813*b* and the second radiating conductor 813*d*. Alternatively, the second antenna 813 may be implemented to only include the second radiating conductor 813*d*.

According to an embodiment, the electronic device (e.g., the electronic device 400 of FIG. 4 or the electronic device 500 of FIG. 5) may further include a first switch module 817*a* (e.g., the switch module 617*a* of FIG. 6) disposed on the power feeding line Fb and a second switch module 817*b* (e.g., the switch module 717*b* of FIG. 7) disposed on the ground line Gb. For example, the second antenna 813 may selectively be connected with the power feeder F (e.g., the communication module 190 of FIG. 1) and the ground G through various selected paths of the first switch module 817*a* and the second switch module 817*b*. According to an embodiment, the path to connect the second antenna 813 with the ground G may be selected by the second switch module 817*b*. The paths selectable by the second switch module 817*b* may differ in electrical length or include a matching device 817c or a lumped device 817d, and the electrical characteristics (e.g., radiating capability) of the second antenna 813 may be adjusted depending on the path selected by the second switch module 817b.

According to an embodiment, while in connection with the power feeder F, the second antenna 813 may perform wireless communication using the same frequency band as the first antenna 513a of FIG. 5, implementing MIMO operation. For example, while the second antenna 813 is in connection with the power feeder F, the electronic device may operate in the multi-mode or MIMO mode. According to an embodiment, while the second antenna 813 is not connected with the power feeder F, the electronic device may operate in the single mode in which wireless communication is performed using the first antenna 513a alone. According to an embodiment, even while the electronic device operates in the single mode, the second antenna 813 may be connected with the power feeder F. When the electronic device (e.g., the electronic device 500 of FIG. 5) is operating in the single mode while the second antenna 813 is connected with the power feeder F, the communication module (e.g., the communication module 190 of FIG. 1) or the processor (e.g., the processor 120 of FIG. 1) of the electronic device may not process signals transmitted or received through the second antenna 813.

According to an embodiment, the above-described first switch module 817a, second switch module 817b, or matching device 817c may be disposed on the power feeding line (e.g., the power feeding line Fa or Fc of FIG. 5) or the ground line (e.g., the ground line Ga or Gc of FIG. 5) of another antenna. For example, an additional switch module or matching device may be provided to the other antenna, optimizing the radiating characteristics of each.

A method of operating an electronic device according to an embodiment is described below with reference to FIG. 9. The operation method is described in greater detail in connection with an electronic device or antennas according to the above-described embodiments.

Figure 9:
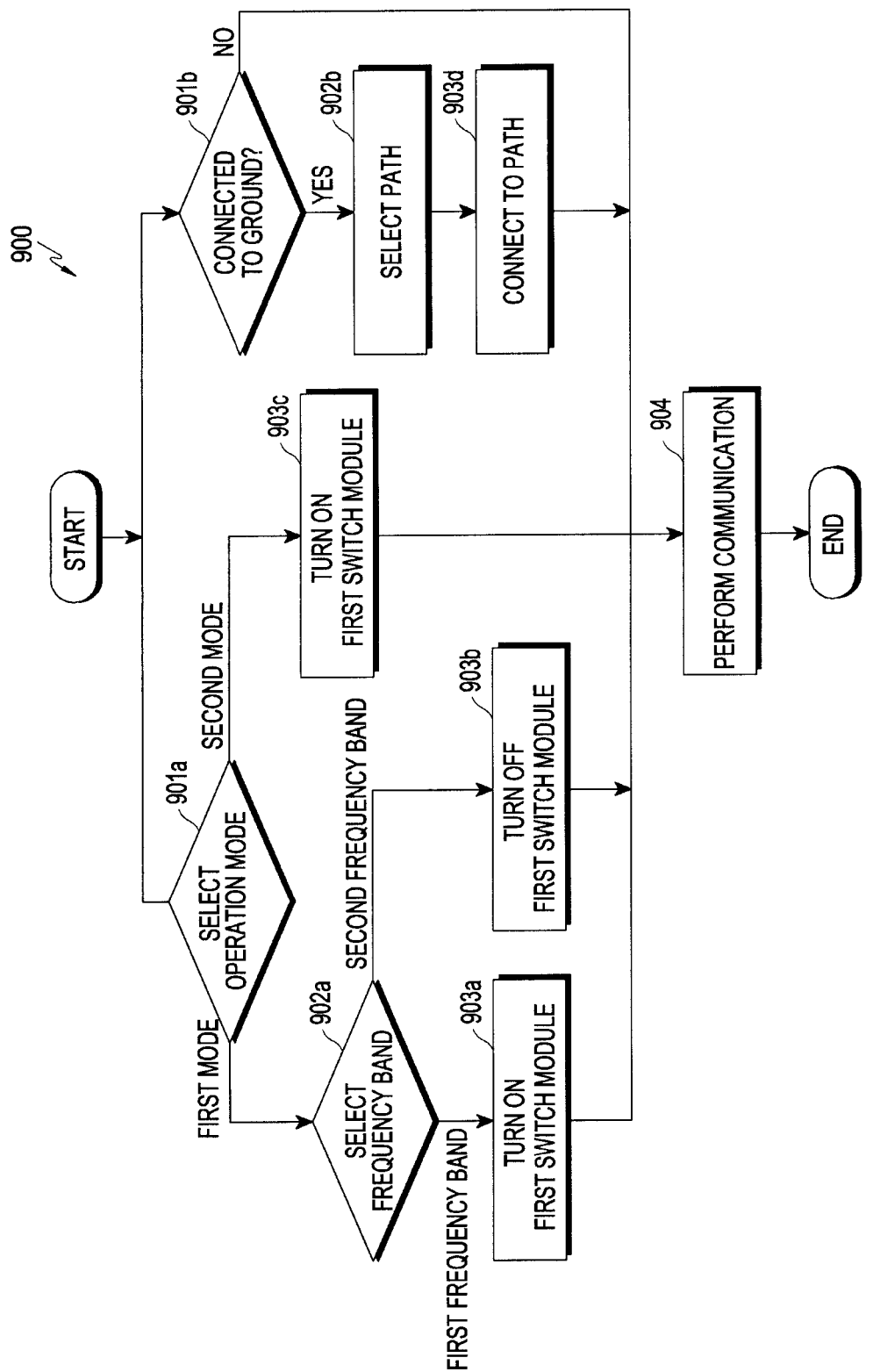
FIG. 9 is a flowchart illustrating a method of operating an electronic device according to an embodiment.

FIG. 9 is a flowchart illustrating a method 900 of operating an electronic device (e.g., the electronic device 400 of FIG. 4 or the electronic device 500 of FIG. 5) according to an embodiment.

Referring to FIG. 9, the operation method 900 may include selecting an operation mode (901a), selecting a frequency band (902a) and, where a first mode (e.g., the single mode) is selected, operating a first switch module as per the selected frequency band (903a and 903b).

According to an embodiment, selecting the operation mode in operation 901a may include selecting between the first mode (e.g., the above-described single mode) and a second mode (e.g., the above-described multi-mode). The second mode may establish communication faster and more stably than the first mode but may consume more power than the first mode. For example, with the device in standby, in operation 901a, the processor or communication module of the electronic device may determine or select the first mode. In contrast, when the device is awake and utilizes a large bandwidth for streaming video content, the second mode may be selected.

According to an embodiment, after the first mode is selected, selecting the frequency band in operation 902a may include selecting a communication frequency band to for the electronic device to perform wireless communication. According to an embodiment, where the first mode is selected, the processor or the communication module may perform wireless communication using a first antenna (e.g., the first antenna 513a of FIG. 5). The first antenna may transmit or receive signals using at least one selected frequency band among a plurality of different frequency bands. In operation 902a, the processor or the communication module may select at least one frequency band in which the first antenna may establish communication. Operation 902a may be executed based on commands, information (e.g., use frequency band settings per telecommunication carrier or per-area use frequency bands) stored in a memory or storage medium or information obtained through communication with a base station.

According to an embodiment, operating the first switch module (e.g., the first switch module 517a of FIG. 5) in operations 903a and 903b may be performed when the first mode, e.g., the single mode, is selected. The operations 903a and 903b may include turning on (903a) or off (903b) the first switch module (e.g., the first switch module 517a of FIG. 5) according to the frequency band selected in operation 902a. As set forth above in connection with Table 1, when the electronic device (e.g., the processor or communication module) performs communication using the first antenna 513a in the single mode, the second antenna 513b may be connected with the communication module according to the frequency band employed by the first antenna 513a, enhancing the radiating capability of the first antenna 513a. For example, where the first antenna 513a performs communication using signals of the first frequency band in the single mode, the first switch module 517a may be switched on in operation 903a.

According to an embodiment, where the variation in the radiating capability of the first antenna 513a according to the turn-on/off of the first switch module 517a is relatively small considering the power consumption of the first switch module 517a, i.e. when the first antenna 513a is operating in one of the second frequency bands described above, the first switch module 517a may be turned off in operation 903b. According to an embodiment, where the radiating capability of the first antenna 513a when cutting off the connection between the second antenna 513b with the communication module in the single mode is higher than when the second antenna 513b is connected with the communication module, the first switch module 517a may also be turned off. Thus, in the single mode, the second antenna 513b may be selectively connected with the communication module depending on the frequency band in which the first antenna 513a performs communication, in order to enhance the radiating capability of the first antenna 513a. For example, even in the single mode, the electronic device may stably perform wireless communication in operation 904.

According to an embodiment, a memory or storage medium (e.g., the memory 130 of FIG. 1) may store information regarding frequency bands classified as the above-described first frequency bands or second frequency bands, information about the on/off state of the first switch module 517a, or commands. For example, the processor or communication module may control the turn-on/off (e.g., whether to electrically connect the second antenna) of the first switch module 517a based on the commands or information stored in the memory or storage medium.

According to an embodiment, in operation 901a, when the second mode, e.g., the multi-mode, is selected, the first switch module 517a may be switched on in operation 903c, and the communication module may perform wireless communication using each of the first antenna 513a and the second antenna 513b. In the second mode, the second antenna 513b may perform communication in operation 904 using the same frequency band as the first antenna 513a. According to an embodiment, the communication module may transmit or receive the same frequency band of signals, e.g., perform a MIMO operation, through each of the first antenna 513a and the second antenna 513b, thereby performing wireless communication at higher speed than in the single mode.

According to an embodiment, the operation method 900 may further include controlling the second switch module (e.g., the second switch module 517b or 817b of FIG. 5 or 8). For example, the operation method 900 may include determining whether to connect the ground G in operation 901b, selecting a connection path in operation 902b, and connecting the path in operation 903d. As set forth above, the second switch module 817b or the matching device 817c may be provided to optimize the radiating characteristics of the second antenna 513b or 813, and the memory or storage medium of the electronic device may store commands or control information about the second switch module 517b or 817b as per, e.g., the operation mode or frequency band in which wireless communication is performed, and the processor may be configured to perform the information or commands stored in the memory or storage medium.

According to an embodiment, an electronic device (e.g., the electronic device 101, 400, or 500 of FIG. 1, 4, or 5) comprises a first antenna (e.g., the first antenna 513a of FIG. 5) configured to perform first communication using a first signal of a first frequency band and second communication using a second signal of a second frequency band in a first mode and a second mode, a second antenna (e.g., the second antenna 513b of FIG. 5) configured to perform the first communication and the second communication in the second mode, a communication module (e.g., the communication module 190 of FIG. 1) configured to perform the first communication and the second communication using the first antenna in the first mode and perform the first communication and the second communication using the first antenna and the second antenna in the second mode, a first switch module (e.g., the first switch module 517a of FIG. 5) disposed between the second antenna and the communication module, and at least one processor (e.g., the processor 120 of FIG. 1) configured to, where the first communication is performed in the first mode, connect the second antenna with the communication module using the first switch module, and where the second communication is performed in the first mode, disconnect the second antenna from the communication module using the first switch module.

According to an embodiment, the electronic device may further comprise a power feeding line (e.g., the power feeding line Fb of FIG. 5) disposed between the communication module and the second antenna, wherein the first switch module may be disposed on the power feeding line to connect or disconnect the communication module and the second antenna.

According to an embodiment, the electronic device may further comprise a ground (e.g., the ground G of FIG. 5) and a second switch module (e.g., the second switch module 517b of FIG. 5) disposed between the ground and the second antenna, wherein the second switch module may be configured to select one of a plurality of paths connecting the second antenna to the ground.

According to an embodiment, the electronic device may further comprise a matching device (e.g., the matching device 817c of FIG. 8) disposed between the ground and the second switch module or between the second switch module and the second antenna.

According to an embodiment, the electronic device may further comprise a front plate (e.g., the front plate 420 of FIG. 4) forming a first surface, a rear plate (e.g., the rear plate 480 of FIG. 4) forming a second surface facing away from the first surface, and a side member (e.g., the side bezel structure 410 of FIG. 4 or the side member 510 of FIG. 5) forming a side surface at least partially surrounding a space between the first surface and the second surface, wherein the first antenna may be at least a portion of the side member.

According to an embodiment, the second antenna may be another portion of the side member.

According to an embodiment, the electronic device may further comprise a first supporting member (e.g., the first supporting member 411 of FIG. 4 or the internal plate 511 of FIG. 5) disposed between the front plate and the rear plate and connected with the side member, wherein the second antenna may include a radiating conductor pattern (e.g., the radiating conductor pattern 513d of FIG. 5) formed in the first supporting member.

According to an embodiment, an electronic device comprises a first antenna configured to perform communication in a plurality of different frequency bands, a second antenna configured to selectively perform communication in a frequency band in which the first antenna performs communication, a communication module configured to perform communication using the first antenna in a single mode and perform communication using the first antenna and the second antenna in a multi-mode, a first switch module disposed between the second antenna and the communication module, a processor electrically connected with the first switch module, and a memory (e.g., the memory 130 of FIG. 1) electrically connected with the processor, wherein the memory is configured to store instructions which, when executed, enable the processor to, where the communication is performed in first frequency bands of the plurality of different frequency bands in the single mode, connect the second antenna with the communication module using the first switch module and, where the communication is performed in second frequency bands of the plurality of different frequency bands different from the first frequency bands in the single mode, disconnect the second antenna from the communication module using the first switch module.

According to an embodiment, the electronic device may further comprise a ground and a second switch module disposed between the ground and the second antenna, wherein the second switch module may be configured to select one of a plurality of paths connecting and disconnecting the second antenna to the ground.

According to an embodiment, the memory may be configured to store instructions which, when executed, further enable the processor to select one of the plurality of paths of the second switch module to connect or disconnect the second antenna and the ground.

According to an embodiment, the electronic device may further comprise a matching device disposed between the ground and the second switch module or between the second switch module and the second antenna.

According to an embodiment, the memory may be configured to store instructions which, when executed, further enable the processor to, where the communication is performed in the multi-mode, connect the second antenna with the communication module using the first switch module.

According to an embodiment, the electronic device may further comprise a front plate forming a first surface, a rear plate forming a second surface facing away from the first surface, and a side member forming a side surface at least partially surrounding a space between the first surface and the second surface, wherein the first antenna may be at least a portion of the side member.

According to an embodiment, the second antenna may be another portion of the side member.

According to an embodiment, the electronic device may further comprise a first supporting member disposed between the front plate and the rear plate and connected with the side member.

The second antenna may include a radiating conductor pattern formed in the first supporting member.

According to an embodiment, a method of operating an electronic device comprises selecting one of a first mode or a second mode as an operation mode of the electronic device, where the first mode is selected, selecting at least one of a plurality of different frequency bands and performing communication through a first antenna, where the selected at least one of a plurality of different frequency bands is a first frequency band, connecting a second antenna with a communication module, and where the selected at least one of a plurality of different frequency bands is a second frequency band, disconnecting the second antenna from the communication module.

According to an embodiment, the method may further comprise, where the second mode is selected, performing, by the first antenna, the communication using at least one of the plurality of different frequency bands and performing, by the second antenna connected with the communication module, the communication in he at least one of the plurality of different frequency bands used by the first antenna.

According to an embodiment, the method may further comprise performing the communication using at least one of the plurality of different frequency bands and using the first antenna alone in the first mode and performing the communication using at least one of the plurality of different frequency bands and using both the first antenna and the second antenna in the second mode.

According to an embodiment, the method may further comprise selecting one of a plurality of paths to connect or disconnect the second antenna to a ground.

According to an embodiment, a storage medium of an electronic device may store instructions configured to enable a processor or a communication module of the electronic device to perform the operation method.

As is apparent from the foregoing description, according to certain embodiments, as the second antenna performs independent transmission or reception (e.g., implementing a multi-input multi-output (MIMO) operation) of signals using the same frequency band as the first antenna, the electronic device may secure a quicker and more stable communication environment. According to an embodiment, in the first mode (e.g., a single input single output (SISO) mode), the electronic device may perform communication through the first antenna while selectively connecting the second antenna with the communication module as per the frequency band in which the first antenna performs communication, enhancing the radiating capability (e.g., radiating power or reception sensitivity) of the first antenna.

While the disclosure has been shown and described with reference to example embodiments thereof, it will be apparent to those of ordinary skill in the art that various changes in form and detail may be made thereto without departing from the disclosure as defined by the following claims.

What is claimed is:

1. An electronic device, comprising:
   a first antenna configured to perform communication in a plurality of different frequency bands;
   a second antenna configured to selectively perform communication in a frequency band in which the first antenna performs communication;
   a communication module configured to perform communication using the first antenna in a single mode and perform communication using the first antenna and the second antenna in a multi-mode;
   a first switch module disposed between the second antenna and the communication module;
   a processor electrically connected with the first switch module; and
   a memory electrically connected with the processor, wherein the memory is configured to store instructions which, when executed, enable the processor to, where the communication is performed in first frequency bands of the plurality of different frequency bands in the single mode, connect the second antenna with the communication module using the first switch module and, where the communication is performed in second frequency bands of the plurality of different frequency bands different from the first frequency bands in the single mode, disconnect the second antenna from the communication module using the first switch module.

2. The electronic device of claim 1, further comprising:
   a ground; and
   a second switch module disposed between the ground and the second antenna, wherein the second switch module is configured to select one of a plurality of paths connecting and disconnecting the second antenna to the ground.

3. The electronic device of claim 2, wherein the memory is configured to store instructions which, when executed, further enable the processor to select one of the plurality of paths of the second switch module to connect or disconnect the second antenna and the ground.

4. The electronic device of claim 2, further comprising a matching device disposed between the ground and the second switch module or between the second switch module and the second antenna.

5. The electronic device of claim 1, wherein the memory is configured to store instructions which, when executed, further enable the processor to, where the communication is performed in the multi-mode, connect the second antenna with the communication module using the first switch module.

6. The electronic device of claim 1, further comprising:
   a front plate forming a first surface;
   a rear plate forming a second surface facing away from the first surface; and
   a side member forming a side surface at least partially surrounding a space between the first surface and the second surface, wherein the first antenna is at least a portion of the side member.

7. The electronic device of claim 6, wherein the second antenna is another portion of the side member.

8. The electronic device of claim 6, further comprising a first supporting member disposed between the front plate and the rear plate and connected with the side member, wherein the second antenna includes a radiating conductor pattern formed in the first supporting member.

* * * * *